Sept. 21, 1926.  H. P. KRAFT  1,600,825
GAUGE AND DEFLATOR
Original Filed Feb. 16, 1918
Fig. 2.
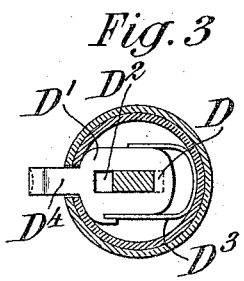
Fig. 1.
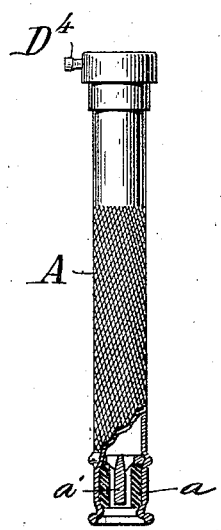
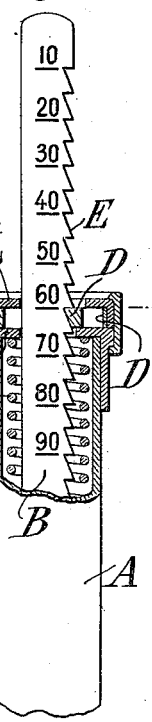
Fig. 5.
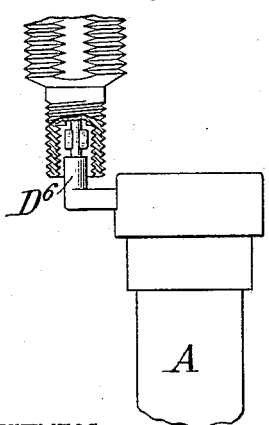
Fig. 4.
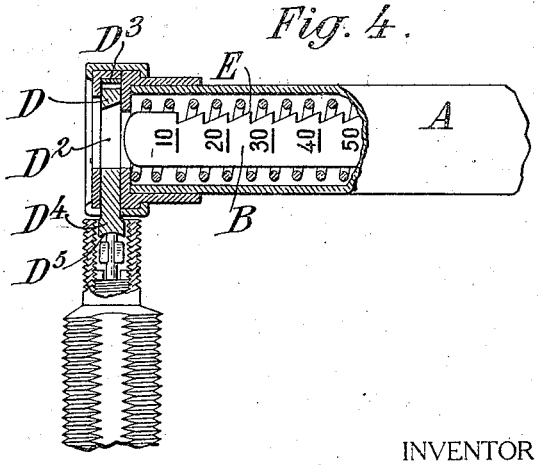
WITNESS:
INVENTOR:
Henry Phillip Kraft,
By Attorneys, Patented Sept. 21, 1926.

1,600,825

UNITED STATES PATENT OFFICE.

HENRY PHILLIP KRAFT, OF RIDGEWOOD, NEW JERSEY; EDGAR J. PHILLIPS AND EARL A. DARR EXECUTORS OF SAID HENRY PHILLIP KRAFT, DECEASED.

GAUGE AND DEFLATOR.

Application filed February 16, 1918, Serial No. 217,504. Renewed March 2, 1926.

My invention has to do with pneumatic tire gauges, more particularly of the type which includes a casing and an indicating member movable within the casing upon the influence of air pressure, and the purpose is to provide a pressure gauge which is manually applicable to a tire valve and which can be readily employed for deflating the tire or casing by holding the valve in an open position, when it is desired to reduce an excess air pressure.

My invention is applicable to the usual type of hand tool tire gauge and preferably includes a suitable projecting device of a form that permits it to enter a tire valve casing, and disposed at such a point upon the gauge as to make it readily accessible and easily applicable to the tire valve. To these and other ends the invention consists in certain improvements and combinations of parts, all as will be hereinafter more fully described in the following specification and pointed out in the accompanying claims.

In the drawings,—

Figure 1 is a side elevation partly in section showing one embodiment of the invention;

Fig. 2 is an enlarged view in side elevation, partially in section, and showing the indicating member withdrawn somewhat from its casing;

Fig. 3 is a horizontal sectional view on the line 3—3 of Fig. 2;

Fig. 4 is a sectional view showing the position of the device when serving to deflate a tire, and Fig. 5 is a side elevation of a modification.

In the present disclosure, which is illustrative of a preferred arrangement of my improvement, there is an elongated casing within which is contained a longitudinal movable indicating member that is held at the extreme limit of its outward movement by a releasable locking device. The indicating member is forced upwardly by air pressure within the tire and a spring serves to return the indicating member to its normal position when the locking device is released. The locking device is preferably movable laterally of the casing and is formed at its outer end so as to be inserted within a tire valve casing for engagement with a valve stem therein.

Referring in more detail to the drawings, A designates a casing for receiving air from a tire through a suitable opening provided with a packing gasket $a$ and a valve depressor $a'$ of usual construction and B is the indicating member which is movable longitudinally of the casing A, the extent of such movement being determined by the amount of pressure. The indicating member B is actuated to its normal position by a spring C, and is held in the position to which the air pressure forces it, by means of a locking device or catch which includes a pawl D arranged to engage any one of a series of teeth E on the indicating member.

The locking device includes a flat plate portion $D'$ which is cut away centrally at $D^2$ to receive the indicating bar B, and is movable laterally of the casing A, being guided by oppositely-disposed walls F and $F'$. A suitable spring $D^3$ acts to force the locking device to its retaining position, as shown in Fig. 2, and the indicating member is released by moving the locking device inwardly against the action of the spring $D^3$. The locking device is controlled by a reduced finger portion $D^4$ which extends through an opening in the side of the casing and serves as a tire deflating means.

The portion $D^4$ is of sufficiently reduced form to permit it to enter a tire valve casing, as shown in Fig. 4, and to engage a valve stem therein. The deflating device $D^4$ is preferably provided at its outer end with a depression or recess $D^5$ which seats on the outer end of the valve stem, as illustrated in Fig. 4, and insures a proper co-operation between the deflating member and the valve stem.

The reduced portion $D^4$ thus serves a double purpose, of a tire deflator and a releasing member for the locking device that controls the indicator. It is also to be observed that the deflator $D^4$ is positioned so as to make it very conveniently applicable to a tire valve, as the operator can grip the casing A centrally and without changing his hold on it, may position the lower end upon the tire valve to obtain a pressure reading, and may then position the deflator at the other end within the tire valve, as shown in Fig. 4, for reducing the pressure.

In Fig. 5 is illustrated a possible modification. The end $D^6$ of the finger portion is bent at right angles to the body, permitting the gauge to be inserted lengthwise, when used as a deflator.

The structure thus provided is an extremely practicable one, requiring a minimum number of parts, and can be manufactured at a reduced cost, which makes it desirable as a commercial article.

The construction of gauge illustrated is not herein described in detail, as it forms the subject-matter of a previous application filed by me on December 16, 1916, Serial No. 137,325 and which matured into Patent No. 1,433,517, on Oct. 24, 1922.

What I claim is:—

1. A pneumatic tire gauge including an air-receiving casing, an indicating member movable in the casing, a catch which co-operates with the indicating member and acts to retain it in indicating position, said catch having a portion projecting outside the casing and a deflating device carried by such portion and formed to permit it to enter a tire valve housing and engage a valve stem therein.

2. A pneumatic tire gauge including an air-receiving casing, an indicating member movable longitudinally of the casing, a catch having reciprocating movement laterally of the casing and co-operating with the indicating member to retain it in adjusted position, said catch having a portion projecting outside the casing and a deflating device carried by such portion and formed to permit it to enter a tire valve housing and engage a valve stem therein.

3. A pneumatic tire gauge including an air-receiving casing, an indicating member movable in the casing, a catch which co-operates with the indicating member and acts to retain it in indicating position, said catch having an end projecting outside the casing and a deflating head on the outer end of the catch, said head being formed to permit it to enter a tire valve housing and having a depression or seat for engagement with a valve stem in the housing.

In witness whereof, I have hereunto signed my name.

HENRY PHILLIP KRAFT.